United States Patent
Kwiatkowski et al.

(10) Patent No.: US 12,210,817 B2
(45) Date of Patent: Jan. 28, 2025

(54) COMPRESSION SCHEME FOR STABLE UNIVERSAL UNIQUE IDENTITIES

(71) Applicant: Microsoft Technology Licensing, LLC, Redmond, WA (US)

(72) Inventors: Paul Jerome Kwiatkowski, Woodinville, WA (US); Daniel Ryan Lehenbauer, Kenmore, WA (US); Taylor Scott Williams, Seattle, WA (US); Noah David Encke, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 17/711,621

(22) Filed: Apr. 1, 2022

(65) Prior Publication Data
US 2023/0252226 A1   Aug. 10, 2023

Related U.S. Application Data

(60) Provisional application No. 63/307,898, filed on Feb. 8, 2022.

(51) Int. Cl.
*G06F 16/93* (2019.01)
*G06F 40/123* (2020.01)
*G06F 40/166* (2020.01)

(52) U.S. Cl.
CPC ............ *G06F 40/166* (2020.01); *G06F 16/93* (2019.01); *G06F 40/123* (2020.01)

(58) Field of Classification Search
CPC .... G06F 40/166; G06F 40/123; G06F 40/197; G06F 16/93; G06F 16/176; G06F 16/906; G06Q 10/101
See application file for complete search history.

(56) References Cited

U.S. PATENT DOCUMENTS

| | | | |
|---|---|---|---|
| 2006/0136511 A1* | 6/2006 | Ngo | G06F 16/93 707/999.203 |
| 2009/0113076 A1* | 4/2009 | Long | G06F 16/178 709/248 |

(Continued)

OTHER PUBLICATIONS

Lehenbauer, et al., "SharedTree: Introduce dense integer 'ShortIds' for addressing nodes #5091", Retrieved from: https://github.com/microsoft/FluidFramework/issues/5091, Feb. 9, 2021, 8 Pages.

*Primary Examiner* — Irete F Ehichioya
*Assistant Examiner* — Xiaoqin Hu
(74) *Attorney, Agent, or Firm* — Schwegman Lundberg & Woessner, P.A.

(57) ABSTRACT

Systems and methods are directed to a compression scheme for stable universally unique identities in a collaborative editing environment. A client receives edits to a document and immediately creates a local short identity for an element of each edit, whereby the local short identity represents an offset from a base unique identity associated with the client from which a unique identifier assigned to the element is derivable. The local short identity information including the local short identity for each element is transmitted to a server. Subsequently, global short identity information is received from the server from which one or more global short identities that each map to a local short identity of a client of a plurality of clients collaborating on the document can be determined by the client. Each global short identity is a compact identity that is universally unique to the plurality of clients including the client.

20 Claims, 11 Drawing Sheets

(56) References Cited

U.S. PATENT DOCUMENTS

| | | | | |
|---|---|---|---|---|
| 2010/0138387 A1* | 6/2010 | Simelius | ............... | G06F 16/178 707/E17.116 |
| 2013/0198155 A1* | 8/2013 | Clarke | .................... | G06F 16/93 707/696 |
| 2016/0357720 A1* | 12/2016 | Thimbleby | ........... | G06F 3/1423 |

* cited by examiner

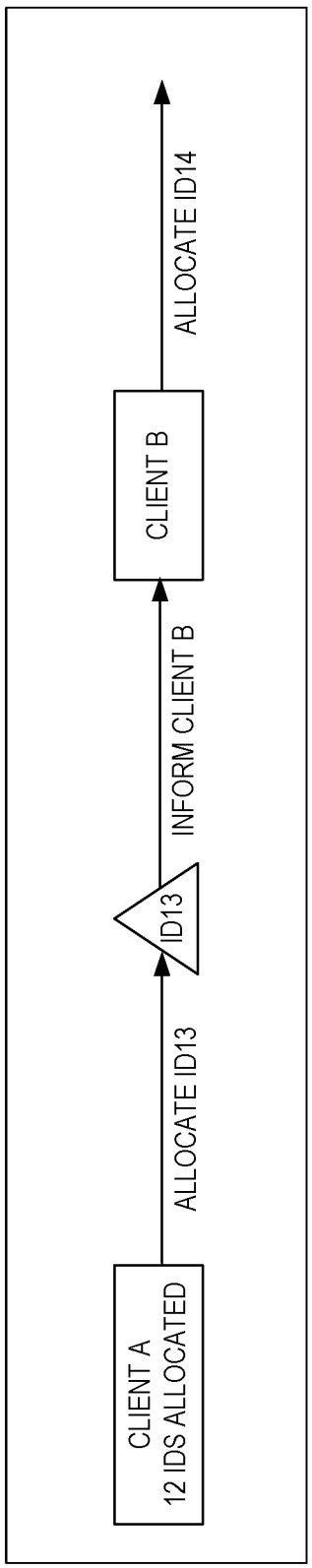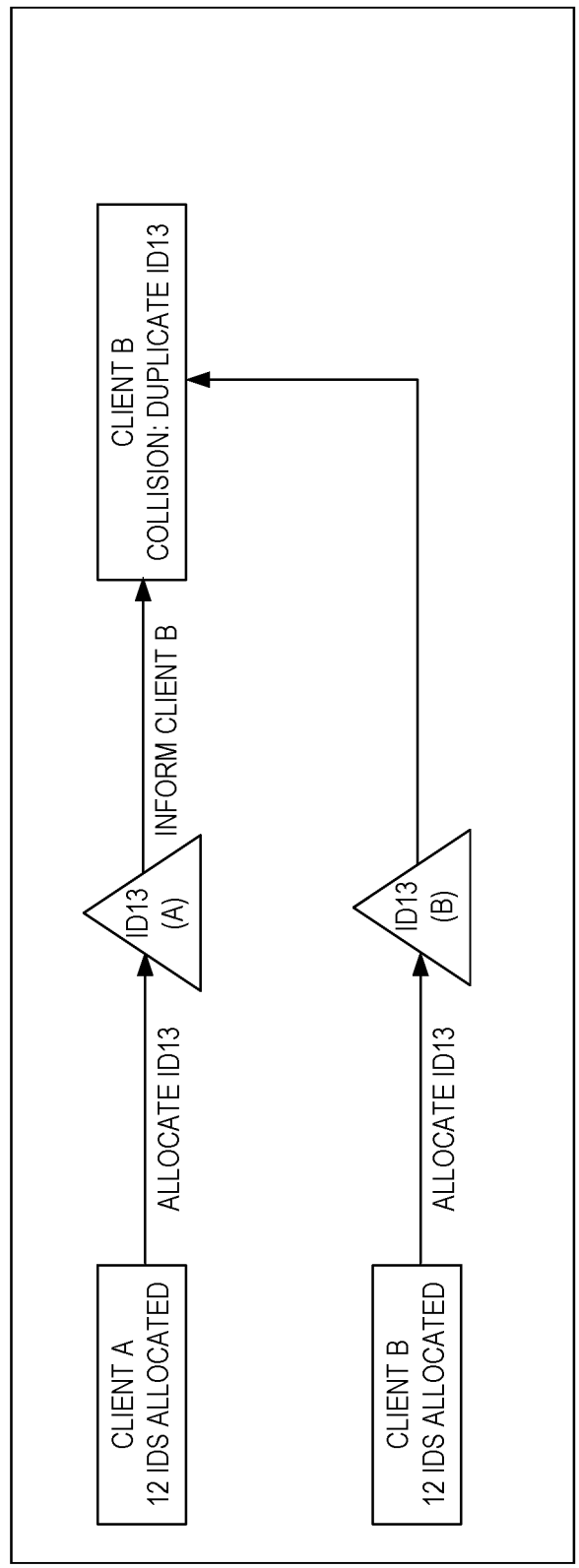
FIG. 2A
FIG. 2B

| H: | ID0 (A): | STABLE ID: 9580F3ED-336E-4F62-A463-984F680DFD73 |
| E: | ID1 (A): | STABLE ID: 9580F3ED-336E-4F62-A463-984F680DFD74 |
| L: | ID2 (A): | STABLE ID: 9580F3ED-336E-4F62-A463-984F680DFD75 |

FIG. 3B

| G: | ID0 (B): | STABLE ID: DBB0EFEE-F862-4F84-A482-1A8874B5B51B |
| R: | ID1 (B): | STABLE ID: DBB0EFEE-F862-4F84-A482-1A8874B5B51C |
| E: | ID2 (B): | STABLE ID: DBB0EFEE-F862-4F84-A482-1A8874B5B51D |

FIG. 3C

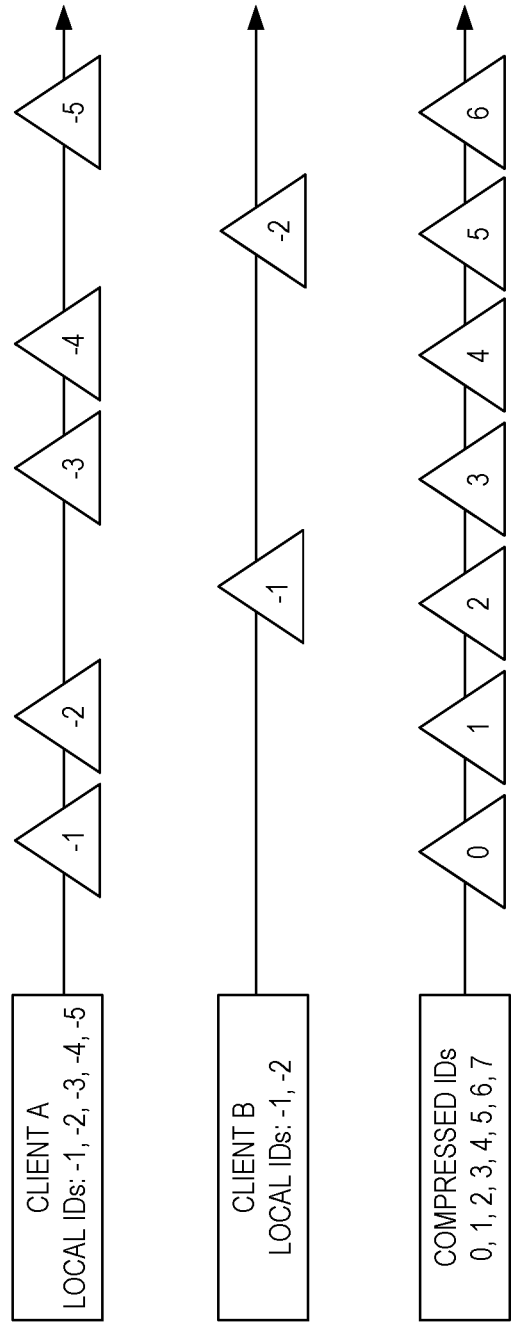

| CLIENT & LOCAL ID | COMPRESSED ID |
|---|---|
| CLIENT A: -1 | 0 |
| CLIENT A: -2 | 1 |
| CLIENT B: -1 | 2 |
| CLIENT A: -3 | 3 |
| CLIENT A: -4 | 4 |
| CLIENT B: -2 | 5 |
| CLIENT A: -5 | 6 |

FIG. 4C

COMPRESSION SCHEME FOR STABLE UNIVERSAL UNIQUE IDENTITIES

CROSS REFERENCE TO RELATED APPLICATIONS

This application claims priority to U.S. Provisional Patent Application No. 63/307,898, filed Feb. 8, 2022, and entitled "Compression Scheme for Stable Universal Unique Identities." The contents of this prior application are considered part of this application and are hereby incorporated by reference in their entirety.

TECHNICAL FIELD

The subject matter disclosed herein generally relates to document editing and collaboration. Specifically, the present disclosure addresses systems and methods that utilizes a compression scheme for stable universal unique identities in a document editing and collaboration environment.

BACKGROUND

In a document collaboration environment, every edit made by a client is an operation that will be transmitted to a server. The server typically provides an order to the edits received from multiple clients based on when the server receives the operations and not based on when the operations were performed. Each element or character of a document can be assigned a universally unique identifier (UUID) at the instant it is created even if the client is not currently connected to the server, which will follow it if it gets moved or removed. However, a UUID is 128 bits. Thus, having a UUID for each character of a document requires more computing resources and is too computationally costly both in time and in space/storage cost.

BRIEF DESCRIPTION OF THE DRAWINGS

Some embodiments are illustrated by way of example and not limitation in the figures of the accompanying drawings.

FIG. 2A and FIG. 2B are diagrams illustrating compressed identity collision.

FIG. 3B and FIG. 3C illustrate tables of the assignment of stable identities to the individual elements, according to an example embodiment.

FIG. 4A and FIG. 4B are diagrams illustrating the use of local and global compressed identities, according to an example embodiment.

FIG. 4C illustrates a table showing a conversion of local compressed identities to global compressed identities, according to an example embodiment.

DETAILED DESCRIPTION

Figure 1:
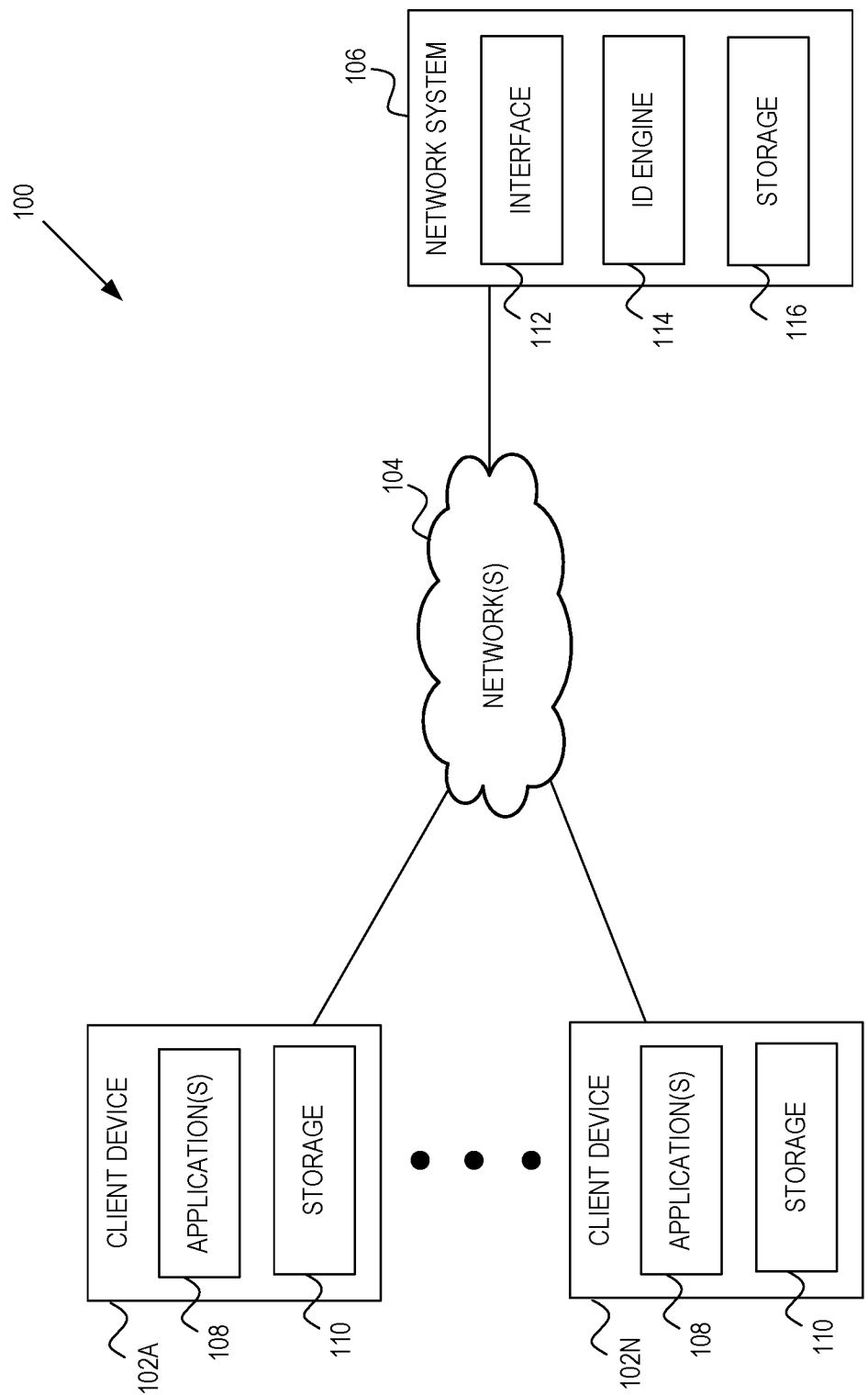
FIG. 1 is a diagram illustrating a network environment suitable for utilizing a compression scheme for stable universal unique identities, according to an example embodiment.

In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Typically, a collaborative editing system involves two or more users editing the same document, either synchronously or asynchronously, and successfully merging their work. A universal tree data structure can allow a document to comprise a single distributed data structure that may simplify the application user experience and yield more uniform and predictable user experiences. Additionally, the application developer experience is also simplified with a single universal data structure. A feature of the universe tree data structure is a stable, universally unique identity for each and every element of the document including individual text characters or simple values in arrays. This feature provides a plurality of benefits.

A first benefit is that cross-document or external references (e.g., Uniform Resource Locators (URLs)) to elements within a document can be created and stored, and later resolved without having to consult a document's history. Without this feature, it is possible to refer to an element, using a path of some sort through the document, but only at a given point in the document's history (e.g., a version number must be stored as part of the reference). If a user wants to resolve a reference in a much later version of the document, the entire set of edits between the two versions must be examined, so the element can be tracked as it is impacted by various edits (e.g., directly or indirectly moved to a new location within the document). This is expensive or can even be impossible if some of the history has been discarded to save space.

Another benefit is that references can be resolved to elements that have been moved between documents. This can be done without requiring access to all documents that an element has resided in before its current location.

A further benefit is that edits can be expressed compactly in terms of identities. Since the identities are not altered by edits (unlike, for example, paths), the edits typically do not need to be altered during merges and can be shared between branches in a serialized branching history.

A final benefit is that treating small primitives (e.g., text characters or numbers within arrays) as if they are document elements with their own identities allows a homogeneous document model, including a simpler application programming interface (API) and uniform representations of references and serialized edits.

Despite these benefits, no conventional system assigns universally unique, stable identities in this manner. The most straightforward implementations are viewed as prohibitively expensive. For example, the most compact identity format that is viewed as possessing universal uniqueness due to the low probability of random collisions is the 128-bit universally unique identifier (UUID). More human-readable formats such as uniform Resource Identifiers (URIs) are typically even bulkier. Storing a UUID on each element or primitive in a document, plus an entry in a map/index to allow an element to quickly be located given only its UUID, would bloat documents significantly. Doing this for primitives such as text characters or numbers within arrays will dramatically bloat most documents. Also, computations involving UUIDs or URIs are particularly expensive in JavaScript, the language of the web. It is therefore desirable to be able to specify an element's unique identity using a simpler "short" descriptor and information that can be shared by many elements.

In example embodiments, a UUID is used for a globally-unique identity and a small integer is used for the short descriptor. It is noted, however, that any globally-unique identity ("Unique ID") representation and compressed or short descriptor ("Short ID") that can be combined to form a new Unique ID can be used. Data-sharing between Unique IDs can be accomplished by "clustering" them (e.g., using numerically-adjacent UUIDs). The Short IDs can encode simple integer offsets from a single base universal unique identifier (also referred to herein as "base UUID"). In some embodiments, the base UUID is a unique session identifier assigned to a client. This way the identities of N nodes can be represented using a single 128-bit base UUID for the cluster, plus N Short IDs (typically 32-bit signed integers) and some overhead for associated data structures. As a result, the cost per identity is not much more than 32 bits.

In some cases, the cost can be reduced below 32 bits per identity, for example, for arrays, characters, or other "atoms" (e.g., numbers, booleans). Because identities are adjacent, they can be inferred from a single "base" Short ID. For example, if a document contains a text string "abcdefghijklm," it can store that the Short ID for "a" is 1234 and from this compute a full UUID when needed. From this, it can infer that the Short ID for "b" is 1235, the Short ID for "c" it is 1236, and so on. This works for both local and global Short IDs. If the string gets chopped up as the user edits, more base IDs may need to be stored. This technique can also be applied to entire nodes within a subtree. As long as the tree remains undisturbed, the identities of the elements in a given subtree can be inferred from the subtree root's identity and how many steps in, for example, a pre-order tree walk it takes to reach the given element.

It is also desirable to be able to derive a full globally-unique ID from a Short ID and, in some cases, its cluster. A simple way to do this is to add the Short ID to a base UUID (e.g., the unique session identifier of the client or a cluster's base UUID). In various embodiments, to avoid occasionally creating invalid UUIDs when adding an offset to a UUID, the system can either perform 62-bit modular arithmetic or avoid using base UUIDs with 62 trailing bits that are "close" (e.g., within 2^53 to 2^62-1).

In a collaborative environment, there are two highly desirable features of an identity scheme. First, every element created in a document should immediately have a unique UUID permanently assigned to it. This should occur even before the client device has had an opportunity to communicate with a central server or other client devices. Giving each element a stable UUID at its moment of creation ensures that external references (e.g., URLs) can be created, stored, or transmitted, and remain valid. Secondly, multiple clients should converge on the same Short IDs for all elements in the document, so that subsequent edits and references within the document can use a single unambiguous Short ID for a given element. Client devices should be able to determine these Short IDs from information relayed to them by the server such that additional network roundtrips are avoided.

Thus, one or more of the methodologies described herein facilitate solving the technical problem of using UUIDs to identify elements of a document without enormous overhead. Specifically, example embodiments create a local short identity (also referred to herein as "local Short ID") that corresponds to unique identity that is assigned to each new element of an edit to the document. The local Short ID is sequenced and mapped, by a server, to a global short identity (also referred to herein as "global Short ID") that is universal to all clients collaborating on the document. The use of the Short IDs typically requires less bits (e.g., 32 bits) than the use of the UUIDs (e.g., 128 bits). The cost per Short ID can be further reduced if the short IDs of some elements or characters are inferred, for example, from their offsets in a pre-order walk of a given subtree and/or indices into arrays (though a base Short ID should be stored for each undisturbed region of the tree within which the identities are inferred). As such, the methodologies described herein may obviate a need for certain efforts or computing resources that otherwise would be involved, for example, in processing large numbers of UUIDs. Examples of such computing resources include processor cycles, network traffic, memory usage, data storage capacity, power consumption, network bandwidth, and cooling capacity.

FIG. 1 is a diagram illustrating a network environment 100 suitable for utilizing a compression scheme for stable universal unique identities, according to an example embodiment. A plurality of client devices 102*a*-102*n* (also referred to herein as "clients 102") are communicatively coupled, via a network 104, to a network system 106 that manages assignment of global compressed identities (also referred to herein as "global Short IDs"). Each client device 102 is a device of a client or user who is using one or more applications 108 to edit a document. Every edit made to a document is an operation (e.g., a location and the edit performed). Typically, each operation is transmitted via the network 104 to the network system 106 (e.g., one or more servers) which comprises a backend service that processes the operations. The client devices 102 may comprise, but are not limited to, a smartphone, tablet, laptop, multi-processor systems, microprocessor-based or programmable consumer electronics, game consoles, set-top boxes, a server, or any other communication device that can generate presentations and can access the network 104.

At the start of a session, each client device 102 selects (or is assigned) a randomly generated identity as their session UUID. This session UUID serves as a base stable UUID ("base UUID" or "base ID") from which identities of each atom can be derived. Each atom (e.g., character, element) of the document gets assigned, at its instance of creation, a local Short ID (also referred to as "local compressed ID"). The local Short ID represents an offset or increment from the base stable ID that will provide the UUID for the atom. A client device 102*a* cannot create global Short IDs (also referred to herein as "global compressed ID") until it has communicated with the server (i.e., the network system 106), so it, instead, assigns local Short IDs. For example, the first three nodes the client device 102a creates may be assigned local Short IDs −1, −2, and −3, representing offsets of 0, +1, and +2 from the client device's chosen base UUID. The client device 102a uses these local Short IDs in its local edits and data structures, but they are never used in this way by any other client devices.

The client device 102a also includes a storage 110 in which a data structure (e.g., a universal tree data structure) is maintained. The data structure can store the base UUIDS, local Short IDs, global Short IDs, and cluster sizes if clusters are used. In some cases, the data structure can also temporarily store its local Short IDs, which may subsequently be replaced by corresponding global Short IDs when received from the network system 106 or derived by the client device 102a as will be discussed further below (e.g., based on identity information received from the network system 106 including a base UUID for other client devices(s), local Short IDs sent by the other client device(s), and a global sequencing order of edits determined by the network system 106). The data structure can provide a mapping between the various identities. Clusters, as will be discussed further below, correspond to an allocated block of global Short IDs.

When the client device 102a can communicate with the network system 106, the client device 102a transmits its local edits, which may include creation of new elements with their new unique identities (e.g., the local Short IDs) and operations in terms of those identities. The client device 102a ensures that all other client devices 102n know its current base UUID, for example, by including it in every message it sends to the network system 106 and/or other client devices (e.g., client device 102n). The network system 106 can relay these edits to all other client devices and back to the original client device 102a, assigning a definitive consistent ordering to all edits (e.g., the global Short IDs or the global sequencing order). The consistent ordering allows all client devices 102 to run the same algorithm in parallel and yield consistent results.

Once the client device 102a knows what global Short IDs its local Short IDs map to, the client device 102a can replace all uses of its local Short IDs with the global Short IDs. If the client device 102a reaches a point where none of its local Short IDs are in use, the client device 102a may choose a new base UUID and begin with reuse of local Short ID −1. At the very least, local Short IDs that are no longer in use can be eliminated from the data structure that maps from local Short IDs to global Short IDs.

Depending on the form of the client devices 102, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The network system 106 manages the assignment of global compressed identities or global Short IDs (used interchangeably) based on local Short IDs and/or the assignment of a global sequencing order. The network system 106 may comprise one or more servers (e.g., cloud servers) to perform its operations and can include an interface 112, an identity (ID) engine 114, and storage 116. In example embodiments, the network system 106 receives the local Short IDs from the plurality of client devices 102. In some embodiments, the local Short IDs is accessed, via the communication network 104 (e.g., the Internet, wireless network, cellular network, or a Wide Area Network (WAN)) from the client devices 102 in batches. For example, the client device 102a may be offline when edits are made to the document. Thus, the local Short IDs cannot be transmitted to the network system 106 until the client device 102a establishes a network connection at which time a batch (e.g., one or more packets) of local Short IDs can be transmitted to the network system 106.

The interface 112 is configured to exchange information, via the network 104, with the client devices 102. As such, the interface 112 can receive information (e.g., data packets) from the client devices 102 that include the local Short IDs. Each packet or message from the client devices 102 may include a corresponding base UUID associated with the client device 102 or a cluster assigned to the client device 102. After processing by the ID engine 114, the interface 112 transmits information back to the plurality of client devices 102. The post-processing packets can include global short identity information including the global Short IDs, the local Short IDs, the base UUID associated with the local Short IDs, and/or a global sequencing order of edits (e.g., based on an order the edits were received by the network system 106).

The ID engine 114 processes the local Short IDs by sequencing the local Short IDs (e.g., generating the global sequencing order) and, in some cases, determining corresponding global Short ID (i.e., compressed ID). In some embodiments, the ID engine 114 also reserves blocks of global identities for each client device 102. For example, a block or cluster (used interchangeably) can comprise 512 identities in positive space. However, any number of identities can be in a block and/or the size of the block can be adaptive. The smaller the cluster size, the larger the table or map because there will be more clusters to track. However, by having larger clusters, more Short ID space is being reserved and portions may go unused. In some embodiments, the ID engine 114 can go back and reuse abandoned portions of clusters. Once an existing block fills up, the ID engine 114 can assign a next available block/cluster to the client device 102.

By using blocks/clusters, other client devices 102 will only need an entry in their conversion table per block/ cluster, as will be discussed in more detail below. This reduces the overhead of keeping the conversion tables by a large factor.

The storage 116 stores information regarding the global Short IDs and base UUIDs. The storage may also store information regarding the blocks that have been assigned to the various client devices 102.

In example embodiments, any of the systems, devices, engines, services, or storage (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 8, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of client devices 102 may be embodied within the network environment 100. While only a single network system 106 is shown, alternative embodiments contemplate having more than one network system 106 to perform the operations discussed herein (e.g., each localized to a particular region).

FIG. 2A and FIG. 2B are diagrams illustrating compressed identity (ID) collision. In a distributed/collaborative system, compressed IDs created by the client devices 102 without intermediate communication may collide. FIG. 2A illustrates a scenario wherein compressed IDs do not collide. As illustrated, client A (e.g., client device 102a) and Client B both know that 12 compressed IDs have been previously allocated. Client A is now allocating the next compressed ID that it knows is available, which is ID13. Client A sends this information to Client B (e.g., via the network 104 and/or the network system 106). Client B receives ID13 from Client A. Subsequently, Client B can allocate a next compressed ID that it knows is available, which is ID14. Because Client B was informed of the allocation by Client A before Client B made any allocations, there is no collision.

Referring now to FIG. 2B, an example illustrating collision is now shown. As in the example of FIG. 2A, Client A and Client B are both aware that 12 compressed IDs have been previously allocated. In the present scenario, Client A allocates the next available compressed ID it is aware of, which is ID13. Before Client A can inform Client B of the allocation (e.g., Client A may be temporarily offline), Client B also allocates the next available compressed ID it is aware of, which is also ID13. Thus, there is a duplicate ID13 assigned. When Client A finally informs Client B (after Client B has assigned ID13), Client B recognizes two of the same ID13—one it created and one created by Client A. This is a collision and violates the uniqueness guarantees of compressed IDs. Example embodiments avoid this scenario by using local compressed IDs specific to each client and global compressed IDs that are universal.

Figure 3A:
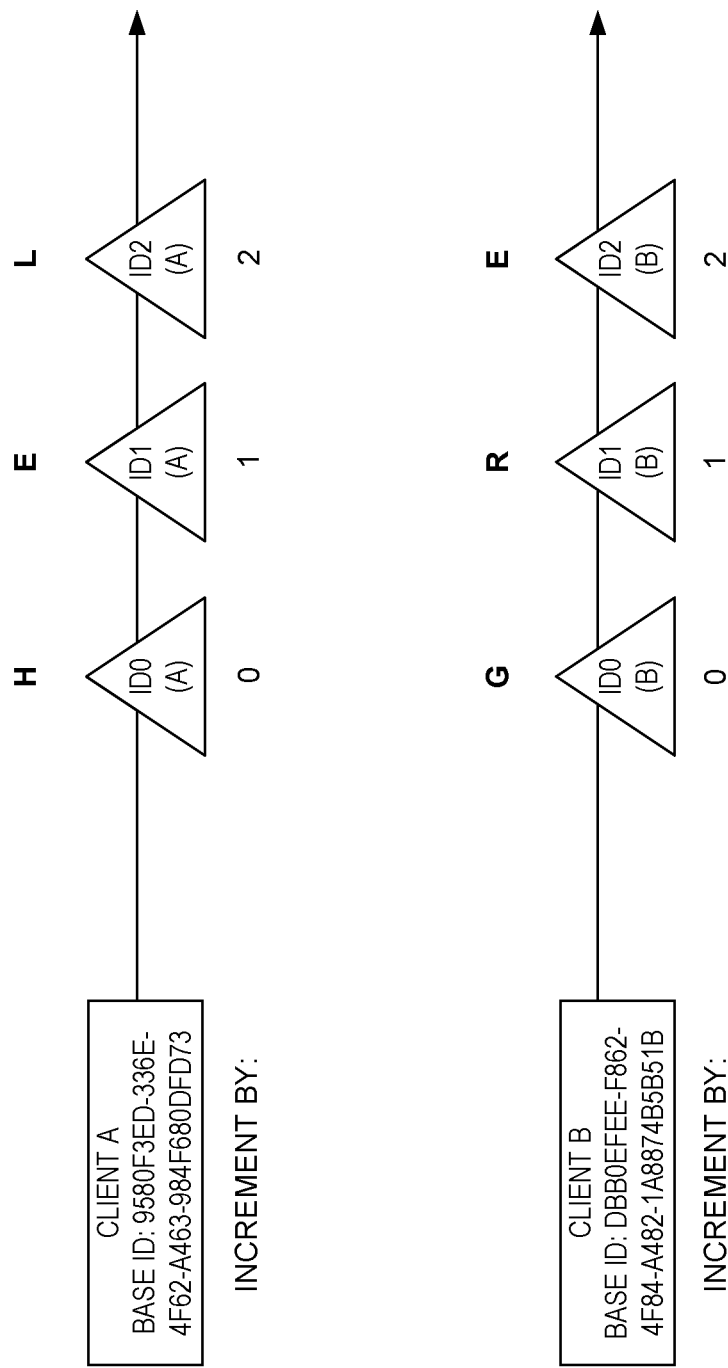
FIG. 3A is a diagram illustrating assignment of stable identities to individual elements, according to an example embodiment.

FIG. 3A is a diagram illustrating assignment of stable identities to individual elements, according to an example embodiment. Every identity has two forms between which it is inexpensive to translate. The first form is a compressed 32-bit number (or similarly small) representation that is document-unique (e.g., the compressed ID). The second form is a stable 128-bit UUID (or similarly large) representation that is globally unique (e.g., the element UUID). The compressed IDs (e.g., global short IDs) are created by incrementing a counter that is consistent across all clients.

In example embodiments, each client (e.g., client device 102) sharing a document has a base ID ("base UUID") from which its stable element UUIDs are offset. Thus, for example, Client A has a base UUID of 9580F3ED-336E-4F62-A463-984F680DFD73. Therefore, a first allocation of an ID (ID0) will be incremented by 0 resulting in a stable element UUID of 9580F3ED-336E-4F62-A463-984F680DFD73 for the first element associated with a first edit (e.g., input letter "H"). A second allocation, ID1, will be incremented by 1 resulting in a stable element UUID of 9580F3ED-336E-4F62-A463-984F680DFD74 for the second element associated with a second edit (e.g., input letter "E"). A third allocation, ID2, will be incremented by 2 resulting in a stable element UUID of 9580F3ED-336E-4F62-A463-984F680DFD75 for the third element associated with a third edit (e.g., input letter "L"). A table illustrating the allocation of the stable element UUIDs for Client A is shown in FIG. 3B.

Referring back to FIG. 3A, a similar process occurs with Client B. For example, Client B has a base UUID of DBB0EFEE-F862-4F84-A482-1A8874B5B51B. Therefore, a first allocation of an ID (ID0) will be incremented by 0 resulting in a stable element UUID of DBB0EFEE-F862-4F84-A482-1A8874B5B51B for the first element associated with a first edit (e.g., input letter "G"). A second allocation, ID1, will be incremented by 1 resulting in a stable element UUID of DBB0EFEE-F862-4F84-A482-1A8874B5B51C for the second element associated with a second edit (e.g., input letter "R"). A third allocation, ID2, will be incremented by 2 resulting in a stable element UUID of DBB0EFEE-F862-4F84-A482-1A8874B5B51D for the third element associated with a third edit (e.g., input letter "E"). A table illustrating the allocation of the stable element UUID for Client B is shown in FIG. 3C.

FIG. 4A and FIG. 4B are diagrams illustrating the use of local and global compressed identifiers, according to an example embodiment. In the example, Client A is inputting "HELLO" while Client B is inputting "GREETINGS." As shown, Client A and Client B are inputting their edits concurrently and the corresponding operations are being transmitted to the server in real-time. Client A types "HE." Before Client A enters "LL," Client B types "G." Similarly, before Client A types "O," Client B enters "R."

In this distributed system example, the clients must coordinate their ID generation to avoid collisions. Example embodiments assign a local compressed ID or local Short ID to each element at their creation, whereby every client has their own set of local Short IDs. Thus, clients will always know their next local Short ID. In one embodiment, the local Short IDs are denoted as negative integers beginning at −1. Thus, as shown in FIG. 4B, Client A assigns local Short IDs of −1 to H, −2 to E, −3 to L, −4 to L, and −5 to O. Similarly, Client B assigns local Short IDs of −1 to G, −2 to R, and so forth. Alternative embodiments can use other numbering conventions such as, for example, even and odd integers instead of positive and negative integers (e.g., even integers are the local Short IDs and odd integers are the global Short IDs or vice-versa).

Once clients agree on the order in which their local Short IDs are allocated, the local Short IDs may be associated with a global compressed or Short ID, which is ordered across all clients. The "agreement" is managed by the network system 106 (e.g., the ID engine 114). In the example of FIG. 4A and FIG. 4B, each edit (e.g., operation) is transmitted to the network system 106 immediately after it is entered. As such, the "G" operation from Client B is sequenced before the "LL" operations from Client A. It is noted that, in other examples, the network system 106, may receive the operations in batches with a delay in transmission.

When there is more than one client editing a document, whoever gets sequenced first will be assigned the next positive number (i.e., global Short ID). Thus, each client device will not know what positive global Short IDs it will receive for their own local Short IDs until it hears back from network system 106. Thus, negative local Short IDs are used when the client device is unsure. Then, positive global Short IDs are used when the client hears back from the network system 106 with the global short identity information.

Because the network system 106 has already sequenced the operations, each client device will know what other client devices did. A client device will only have its own negative local Short IDs because those are the only IDs it is unsure of; it will never be uncertain about another client device's edits.

Here, the agreed-to global Short IDs are assigned sequentially based on an order the network system 106 receives the operations. Thus, H is assigned a global Short ID of 0, E assigned a global Short ID of 1, the first L assigned a global Short ID of 3, the second L assigned a global Short ID of 4, and O assigned a global Short ID of 6. FIG. 4C illustrates a table showing the mapping of the global Short IDs to each local Short ID of Client A and Client B.

Example embodiments allow the use of global Short IDs to represent elements in the document. However, there may be instances where the long, stable UUID for an element is needed. For example, when sending out a hyperlink in the document, the entire 128 bits needs to be sent to a user that may not have access to the table for conversion. In this scenario, the client may take the negative local Short ID (e.g., −5), reverse the sign of the negative number (e.g., +5), subtract 1 (e.g., +4), and add that number to the client's session UUID.

Figure 4D:
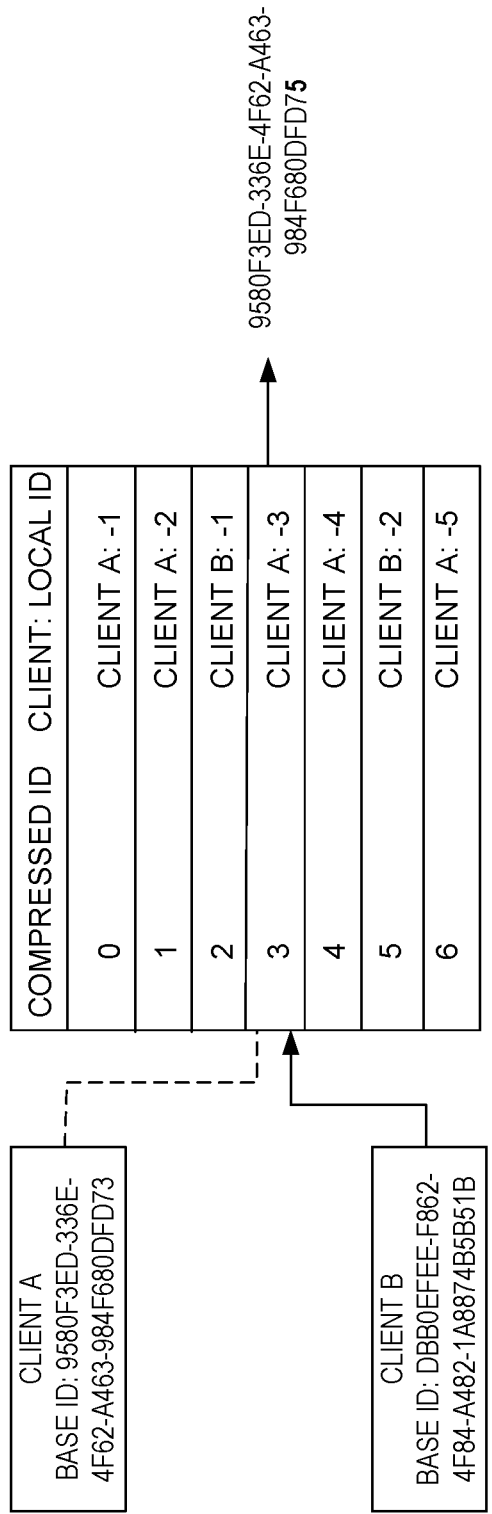
FIG. 4D shows a lookup table, according to an example embodiment.

Referring now to FIG. 4D, a client can use either a local Short ID or a compressed/global Short ID to identify data. Since local Short IDs are ambiguous across clients (i.e., −2 made by Client A is not the same as −2 made by Client B), each client translates local Short IDs received from other clients to the global Short IDs. Clients can do this via a lookup table that is updated each time new IDs are received from any client (or the network system 106). Every client has a copy of the lookup table (e.g., lookup table of FIG. 4D). The local/compressed lookup table is sufficient to convert from a local Short ID (from any client) to a compressed ID. Assuming the table is bidirectional, a client can also convert compressed IDs to stable IDs (i.e., stable UUIDs).

For example, assume Client B wants to determine what the stable UUID is for compressed global ID3. Client B accesses the lookup table and searches for the client and local Short ID that maps to compressed global ID3. Here, the client is Client A and the local Short ID is −3, which is the third local Short ID created by Client A. Client B also knows every other client's base UUID. In this example, Client B knows Client A's base UUID is 9580F3ED-336E-4F62-A463-984F680DFD73. Client B can then derive the stable UUID corresponding to compressed ID3 by reversing the sign of the negative number associated with the local Short ID (e.g., from −3 to +3), subtracting 1 (e.g., +2), and adding that number to the base UUID. This results in a stable UUID of 9580F3ED-336E-4F62-A463-984F680DFD75.

Figure 5:
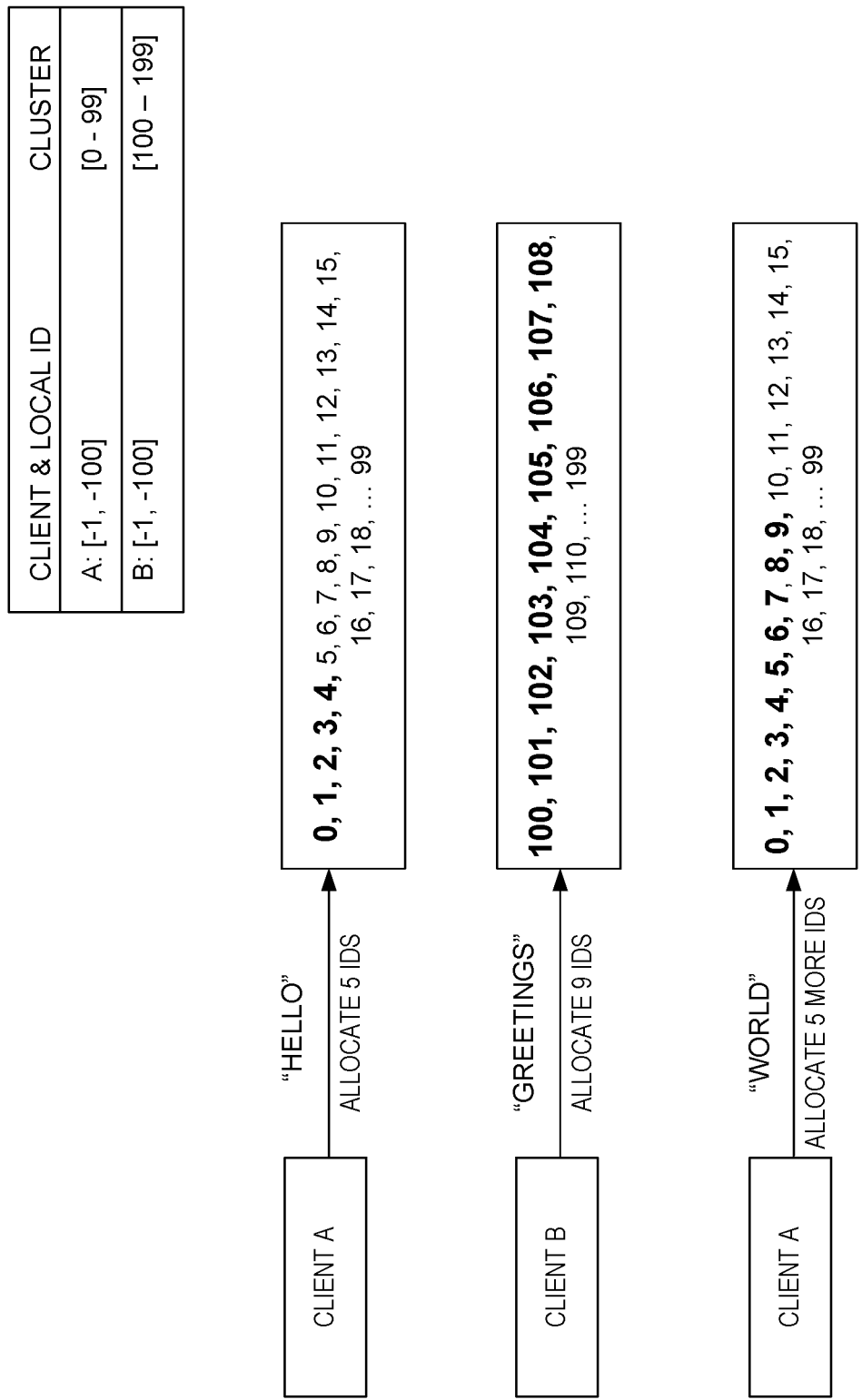
FIG. 5 is a diagram illustrating use of identity clusters, according to an example embodiment.

FIG. 5 is a diagram illustrating use of identity clusters, according to an example embodiment. As discussed above, example embodiments may assign blocks or clusters of global Short IDs to each client. A cluster may be assigned to a client upon its first edit to the document. For example, when Client A transmits the operation associated with the entry of "H," the network system 106 can allocate a cluster of a particular size. In the example of FIG. 5, the cluster has a size of 100. Thus, the first cluster will comprise global Short IDs of 0-99. Similarly, when Client B transmits the operation associated with the entry of "G," the network system 106 allocates a second cluster to Client B. The second cluster comprises global Short IDs 100-199. In addition to a number range inside each cluster, the network system 106 (e.g., the ID engine 114) also stores the 128-bit UUID for the first number/value in the range or cluster. This base UUID for the first number is not necessarily the session UUID, but a UUID that, when a local Short ID is added to it, will result in the actual UUID for the element/node.

Because clusters are being used, the allocation of the global Short ID is not entirely based on the order that the network system 106 receives the operations from the plurality of client devices clients 102. For example, assuming that the order of the operations occurs as illustrated in FIG. 4A, the local Short IDs of Client A for "Hello" (i.e., −1, −2, −3, −4, −5) will convert to global Short IDs 0, 1, 2, 3, 4, respectively. This is different than the global Short IDs assigned in FIG. 4B where clusters were not used. Similarly, the local Short IDs of Client B for "Greetings" (i.e., −1, −2, −3, −4, −5, −6, −7, −8, −9) will convert to global Short IDs 100, 101, 102, 103, 104, 105, 106, 107, and 108, respectively.

When Client A later (after Client B enters "Greeting") provides further edits, here entering "World," the global Short ID assigned to the elements of the further edits continue from Client A's cluster. Therefore, W, O, R, L, D will map to local Short IDs of −6, −7, −8, −9, and −10 of Client A and global Short IDs of 5, 6, 7, 8, and 9, respectively.

If Client A exhausts all global Short IDs in their cluster, then the network system 106 assigns a next available cluster to Client A. In the example of FIG. 5, the next available cluster comprises global Short IDs 200-299.

In some embodiments, the network system 106 may reassign portions of a cluster that are abandoned. For example, if Client B only types "Greetings" and has not made any further edits within a predetermined threshold amount of time (e.g., one month, one year), the network system 106 can allocate a portion of Client B's cluster (e.g., global Short IDs 109-199) to another client (e.g., Client C).

In some embodiments, the size of the cluster may be adaptive or dynamic. For example, if Client A fills up their first cluster (e.g., with the range of global Short IDs 0-99) within a short threshold amount of time (e.g., within five minutes), the network system 106 may assign a larger next cluster to Client A. For example, the next cluster can comprise 200 global Short IDs. In example embodiments, a protocol followed by all clients may be used to determine and assign the adaptive or dynamic cluster, whereby the protocol ensures that all the clients know what the cluster size is/was.

The process to obtain the stable UUID for an element is similar to the process discussed in connection with FIG. 4D. For example, if Client A wants to determine the stable UUID that corresponds to global Short ID102, Client A accesses the lookup table and determines that compressed ID102 maps to the second cluster which is assigned to Client B (i.e., cluster [100, 199]). Compressed ID102 is the third entry in the cluster and thus maps to the third entry for the local Short ID of Client B, which is −3. Here, Client A knows the base UUID for the first number in the range/cluster (e.g., the UUID for the first element of the cluster). In the present example, the base UUID corresponds to Client B's session UUID, DBB0EFEE-F862-4F84-A482-1A8874B5B51B. However, alternative embodiments may assign a different stable UUID for the first number of the cluster. Client A can then derive the stable UUID corresponding to compressed ID102 by reversing the sign of the negative number (e.g., from −3 to +3), subtracting 1 (e.g., +2), and adding that number to the cluster's base UUID. This results in a stable UUID of DBB0EFEE-F862-4F84-A482-1A8874B5B51D.

Figure 6:
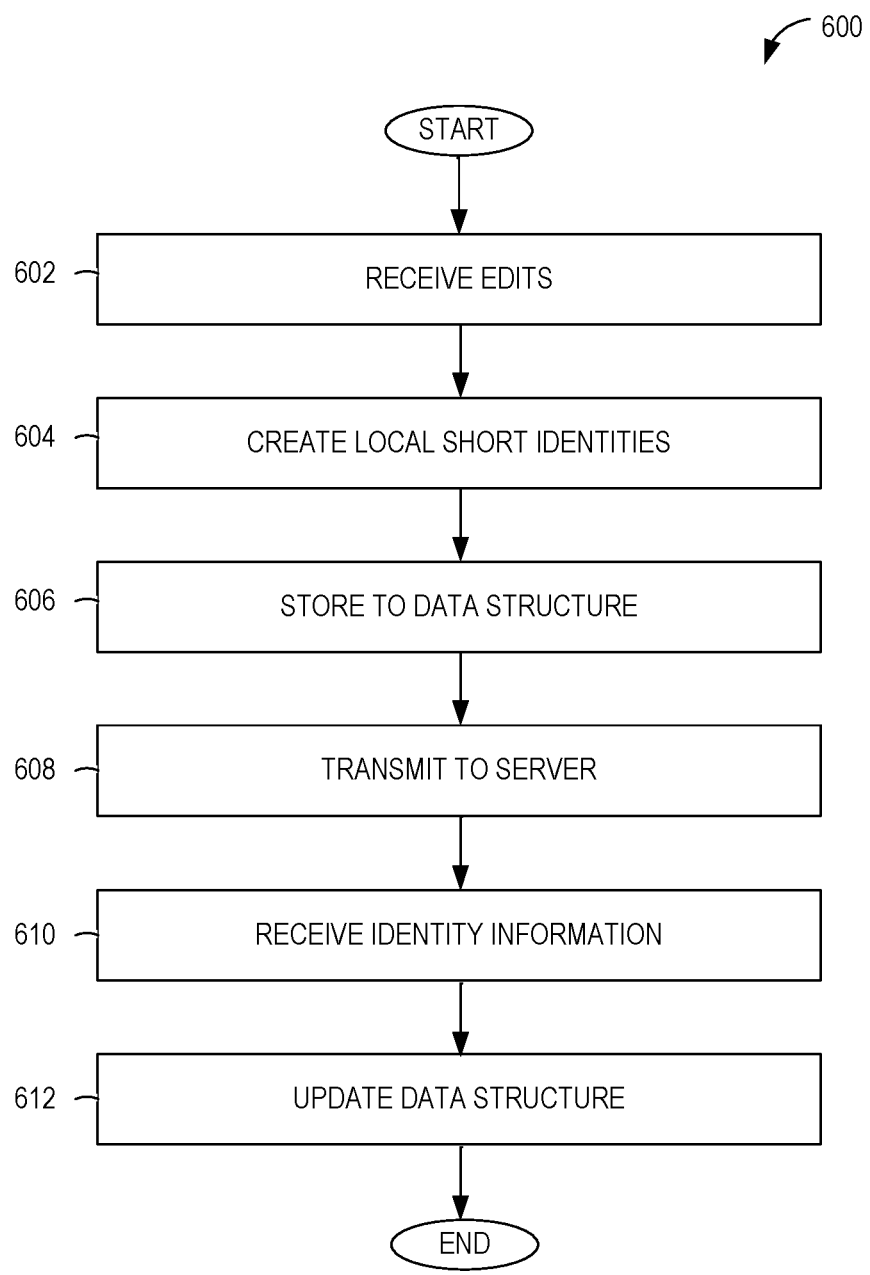
FIG. 6 is a flowchart illustrating operations of a method for utilizing a compression scheme for stable universal unique identities at a client device, according to an example embodiment.

FIG. 6 is a flowchart illustrating operations of a method 600 for utilizing a compression scheme for stable universal unique identities, according to an example embodiment. Operations in the method 600 may be performed by a client (e.g., client device 102*a*) described above with respect to FIG. 1. Accordingly, the method 600 is described by way of example with reference to these components in the client device 102. However, it shall be appreciated that at least some of the operations of the method 600 may be deployed on various other hardware configurations or be performed by similar components residing elsewhere in the network environment 100 (e.g., at the network system 106). Therefore, the method 600 is not intended to be limited to these components.

In operation 602, the client (e.g., client device 102*a*) receives one or more edits or operations from a user. The edits may be performed via the application 108 embodied thereon.

In operation 604, the client creates a local Short ID for each element/node of an edit. In example embodiments, the local Short ID represents an offset from a base unique identity associated with the client.

In operation 606, the local Short ID is stored to a local data structure (e.g., storage 110). In various embodiments, the data structure comprises a mapping that includes the elements, local Short IDs, and any known global Short IDs.

In operation 608, the client transmits local short identity information to the server (e.g., the network system 106) including the local Short ID for each element. The transmission may occur substantially in real-time if the client is online while making the edits. Alternatively, if the client is working offline, the operations are sent (e.g., in a batch) when the client connects to the network 104.

In operation 610, the client receives global short identity information (or "identity information") from the server after the server has sequenced the incoming operations. In some embodiments, the global short identity information comprises the global Short IDs assigned by the server. In other embodiments, the global short identity information includes a base unique identity for at least one other client, local Short IDs sent by at least one other client, and a global sequencing order of edits determined by the server. In these embodiments, the client uses the base unique identity, the local Short IDs, and the global sequencing order to derive the global Short IDs. The global Short IDs can correspond to the client's own local Short IDs as well as local Short IDs of other clients that are collaborating on the same document.

In operation 612, the client device 102 updates the data structure with the global Short IDs. For example, global Short IDs may be mapped to corresponding local Short IDs in the data structure.

Figure 7:
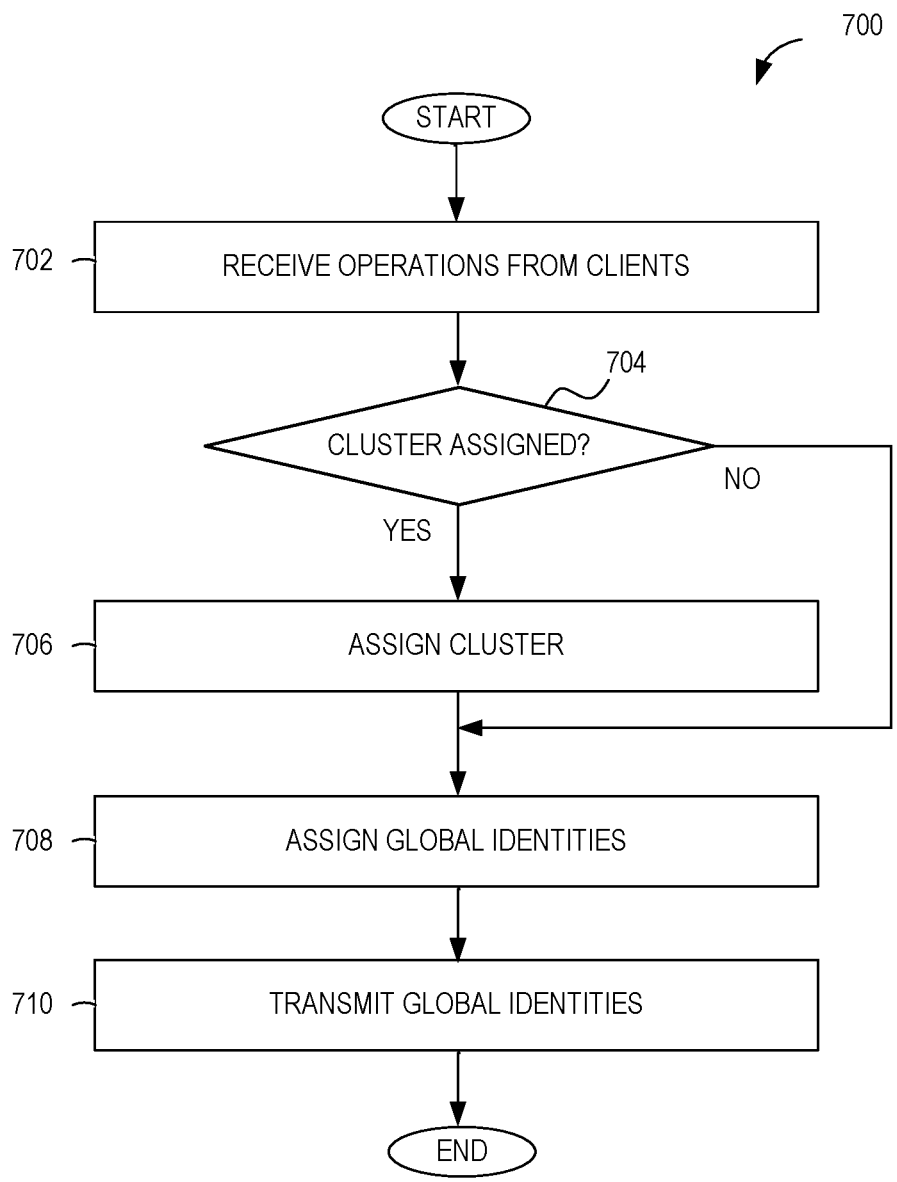
FIG. 7 is a flowchart illustrating operations of a method for utilizing a compression scheme for stable universal unique identities at a network system, according to an example embodiment.

FIG. 7 is a flowchart illustrating operations of a method 700 for utilizing a compression scheme for stable universal unique identities at a server (e.g., the network system 106), according to an example embodiment. Operations in the method 700 may be performed by, for example, the network system 106 described above with respect to FIG. 1. While the method 700 is described by way of example with reference to the server, it shall be appreciated that at least some of the operations of the method 700 may be deployed on various other hardware configurations or be performed by similar components residing elsewhere in the network environment 100. For example, some of the operations of FIG. 7 can be performed by one or more clients. Therefore, the method 700 is not intended to be limited to these components.

In operation 702, the server receives the operations from the clients. The operations can include local Short IDs associated with each element/node.

In operation 704, a determination is made whether a cluster should be assigned. If a cluster should be assigned, then in operation 706, the cluster assignment is made. If the operation is a first operation from a specific client, the server will assign a next available cluster to the client. Alternatively, if the client has a full cluster, the next available cluster is assigned to the client.

If a cluster should not be assigned, then the method 700 proceeds to operation 708. For example, if the client already has an assigned cluster which is not full, a new cluster is not needed. Furthermore, in embodiments that do not use clusters/blocks, operations 704 and 706 are not needed.

In operation 708, the server assigns global Short IDs to each of the local Short IDs. In embodiments that do not use clusters, the global Short IDs may be assigned sequentially as the operations are received from the clients. In embodiments that use clusters, the global Short IDs are assigned from the cluster of the corresponding client and comprise the next available global Short ID from the respective cluster.

In operation 710, the server transmits global Short ID information back to the clients. The global Short ID information may include the mapping (e.g., assignment) of the local Short IDs to each global Short ID. The global Short ID information may also include a base UUID for clients and/or a first number of each cluster.

In some embodiments, the server may, instead of assigning global Short IDs, sequence the operations from clients as they are received to generate the global sequencing order of edits. The server than provides the global sequencing order along with a base unique identity for each of the other clients and local Short IDs of the other clients to each client. The clients can then determine the global Short IDs using this information.

Figure 8:
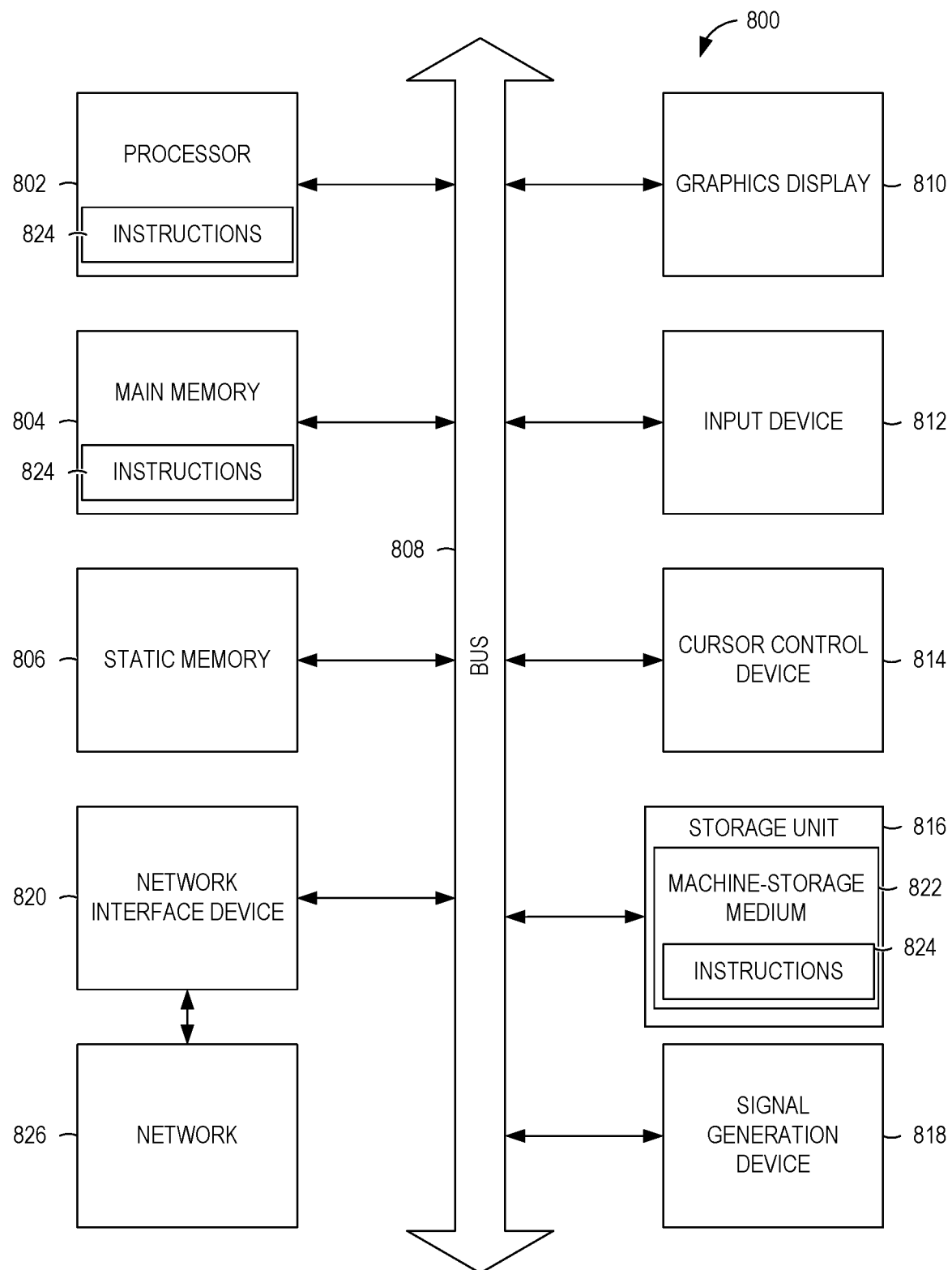
FIG. 8 is a block diagram illustrating components of a machine, according to some example embodiments, able to read instructions from a machine-storage medium and perform any one or more of the methodologies discussed herein.

FIG. 8 illustrates components of a machine 800, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIG. 6 to FIG. 7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-storage medium 822 (e.g., a tangible machine-storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-storage media (e.g., tangible and non-transitory media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for utilizing a compression scheme for stable universal unique identities. The method comprises receiving, by a first client, one or more edits to a document; immediately in response to receiving the one or more edits, creating, by the first client, a local short identity for an element of each edit, the local short identity representing an offset from a base unique identity associated with the first client from which a unique identifier assigned to the element is derivable; transmitting, by the first client, local short identity information including the local short identity for each element to a server; determining, by the first client from global short identity information received from the server, one or more global short identities that each map to a local short identity of a client of a plurality of clients collaborating on the document, each global short identity being a compact identity that is universally unique to the plurality of clients including the first client; and updating, at the first client, a data structure that maps each local short identity with a corresponding global short identity determined from the global short identity information.

In example 2, the subject matter of example 1 can optionally include wherein the local short identity comprises a negative integer and the global short identity comprises a positive integer.

In example 3, the subject matter of any of examples 1-2 can optionally include wherein the base unique identity comprises a session identifier assigned to the first client.

In example 4, the subject matter of any of examples 1-3 can optionally include wherein the base unique identity comprises a base identity assigned to a cluster of global short identities assigned to the first client.

In example 5, the subject matter of any of examples 1-4 can optionally include assigning a cluster of global short identities to the first client, wherein each global short identity comprises a value assigned from the cluster of global short identities.

In example 6, the subject matter of any of examples 1-5 can optionally include wherein assigning the cluster of global short identities comprises determining a size of the cluster of global short identities to assign to the first client, the size being adaptive.

In example 7, the subject matter of any of examples 1-6 can optionally include wherein assigning the cluster of global short identities comprises determining a size of the cluster of global short identities to assign to the first client, the size being fixed.

In example 8, the subject matter of any of examples 1-7 can optionally include wherein the global short identity information received from the server comprises the one or more global short identities.

In example 9, the subject matter of any of examples 1-8 can optionally include wherein the global short identity information received from the server comprises a base unique identity for at least one other client, local short identities sent by the at least one other client, and a global sequencing order of edits determined by the server; and the determining the one or more global short identities comprises computing the one or more global short identities based on the base unique identity for the at least one other client, the local short identities sent by the at least one other client, and the global sequencing order of edits.

Example 10 is a system that utilizes a compression scheme for stable universal unique identities. The system comprises one or more hardware processors and a memory storing instructions that, when executed by the one or more hardware processors, cause the one or more hardware processors to perform operations comprising receiving, by a first client, one or more edits to a document; immediately in response to receiving the one or more edits, creating, by the first client, a local short identity for an element of each edit, the local short identity representing an offset from a base unique identity associated with the first client from which a unique identifier assigned to the element is derivable; transmitting, by the first client, local short identity information including the local short identity for each element to a server; determining, by the first client from global short identity information received from the server, one or more global short identities that each map to a local short identity of a client of a plurality of clients collaborating on the document, each global short identity being a compact identity that is universally unique to the plurality of clients including the first client; and updating, at the first client, a data structure that maps each local short identity with a corresponding global short identity determined from the global short identity information.

In example 11, the subject matter of example 10 can optionally include wherein the local short identity comprises an even integer and the global short identity comprises an odd integer, or the local short identity comprises an odd integer and the global short identity comprises an even integer.

In example 12, the subject matter of any of examples 10-11 can optionally include wherein the base unique identity comprises a session identifier assigned to the first client.

In example 13, the subject matter of any of examples 10-12 can optionally include wherein the base unique identity comprises a base identity assigned to a cluster of global short identities assigned to the first client.

In example 14, the subject matter of any of examples 10-13 can optionally include assigning a cluster of global short identities to the first client, wherein each global short identity comprises a value assigned from the cluster of global short identities.

In example 15, the subject matter of any of examples 10-14 can optionally include wherein the global short identity information received from the server comprises the one or more global short identities.

In example 16 the subject matter of any of examples 10-15 can optionally include wherein the global short identity information received from the server comprises a base unique identity for at least one other client, local short identities sent by the at least one other client, and a global sequencing order of edits determined by the server; and the determining the one or more global short identities comprises computing the one or more global short identities based on the base unique identity for the at least one other client, the local short identities sent by the at least one other client, and the global sequencing order of edits.

Example 17 is a computer-storage medium comprising instructions which, when executed by one or more hardware processors of a machine, cause the machine to perform operations for utilizing a compression scheme for stable universal unique identities. The operations comprise receiving, by a first client, one or more edits to a document; immediately in response to receiving the one or more edits, creating, by the first client, a local short identity for an element of each edit, the local short identity representing an offset from a base unique identity associated with the first client from which a unique identifier assigned to the element is derivable; transmitting, by the first client, local short identity information including the local short identity for each element to a server; determining, by the first client from global short identity information received from the server, one or more global short identities that each map to a local short identity of a client of a plurality of clients collaborating on the document, each global short identity being a compact identity that is universally unique to the plurality of clients including the first client; and updating, at the first client, a data structure that maps each local short identity with a corresponding global short identity determined from the global short identity information.

In example 18, the subject matter of example 17 can optionally include wherein the base unique identity comprises a session identifier assigned to the first client.

In example 19, the subject matter of any of examples 17-18 can optionally include wherein the base unique identity comprises a base identity assigned to a cluster of global short identities assigned to the first client.

In example 20, the subject matter of any of examples 17-19 can optionally include assigning a cluster of global short identities to the first client, wherein each global short identity comprises a value assigned from the cluster of global short identities.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for synchronizing edits from a plurality of clients collaborating on a document, the method comprising:

receiving, by a first client of the plurality of clients, one or more edits made to the document at the first client;

immediately in response to receiving each edit of the one or more edits, creating, by the first client, a local short identity for each character of the edit as the edit is made, the local short identity representing an offset from a base unique identifier associated with the first client, application of the offset to an end of the base unique identifier associated with the first client creating a stable universally unique identifier for each character of the edit;

temporarily storing each local short identity of the first client in a data structure at the first client;

transmitting, by the first client, local short identity information including the local short identity for each character to a server, the server allocating global short identities based on an order of receipt of local short identities from the plurality of clients collaborating on the document, each global short identity being a compact identity that is universally unique to the plurality of clients;

receiving, by the first client, global short identity information from the server including the allocated global short identities;

determining, by the first client from the global short identity information received from the server, one or more global short identities that each map to a local short identity of a second client of the plurality of clients collaborating on the document;

using the one or more global short identities determined from the global short identity information to identify corresponding edits from the second client; and updating, at the first client, the data structure by replacing each temporarily stored local short identity with a corresponding global short identity determined from the global short identity information.

2. The method of claim 1, wherein the local short identity comprises a negative integer and the global short identity comprises a positive integer.

3. The method of claim 1, wherein the base unique identifier comprises a session identifier assigned to the first client and each offset causes a value at the end of the session identifier to be incremented.

4. The method of claim 1, further comprising:
assigning a cluster of global short identities to the first client and assigning a second cluster of global short identities to the second client, the second cluster being a next set of sequential global short identities after the global short identities of the first cluster.

5. The method of claim 1, further comprising:
assigning a cluster of global short identities to the first client, wherein each global short identity of the cluster comprises a value assigned from a cluster of global short identities.

6. The method of claim 5, wherein assigning the cluster of global short identities comprises determining a size of the cluster of global short identities to assign to the first client, the size being adaptive based on an amount of time used to fill up a previous cluster.

7. The method of claim 5, wherein assigning the cluster of global short identities comprises determining a size of the cluster of global short identities to assign to the first client, the size being fixed.

8. The method of claim 1, further comprising:
creating the stable universally unique identifier by reversing a sign of a negative number associated with a local short identity to obtain a result, subtracting −1 one from the result to derive a number, and adding the number to the base unique identifier.

9. The method of claim 1, wherein:
the global short identity information received from the server comprises a base unique identifier for at least one other client, local short identities sent by the at least one other client, and a global sequencing order of edits determined by the server; and the determining the one or more global short identities comprises computing the one or more global short identities based on the base unique identifier for the at least one other client, the local short identities sent by the at least one other client, and the global sequencing order of edits.

10. A system for synchronizing edits from a plurality of clients collaborating on a document, the system comprising:
one or more hardware processors; and
a memory storing instructions that, when executed by the one or more hardware processors, cause the one or more hardware processors to perform operations comprising:
receiving, by a first client of the plurality of clients, one or more edits made to the document at the first client;
immediately in response to receiving each edit of the one or more edits, creating, by the first client, a local short identity for each character of the edit as the edit is made, the local short identity representing an offset from a base unique identifier associated with the first client, application of the offset to an end of the base unique identifier associated with the first client creating a stable universally unique identifier for each character of the edit;

temporarily storing each local short identity of the first client in a data structure at the first client;

transmitting, by the first client, local short identity information including the local short identity for each character to a server, the server allocating global short identities based on an order of receipt of local short identities from the plurality of clients collaborating on the document, each global short identity being a compact identity that is universally unique to the plurality of clients;

receiving, by the first client, global short identity information from the server including the allocated global short identities;

determining, by the first client from the global short identity information received from the server, one or more global short identities that each map to a local short identity of a second client of the plurality of clients collaborating on the document;

using the one or more global short identities determined from the global short identity information to identify corresponding edits from the second client; and updating, at the first client, the data structure by replacing each temporarily stored local short identity with a corresponding global short identity determined from the global short identity information.

11. The system of claim 10, wherein:
the local short identity comprises an even integer and the global short identity comprises an odd integer, or
the local short identity comprises an odd integer and the global short identity comprises an even integer.

12. The system of claim 10, wherein the base unique identifier comprises a session identifier assigned to the first client and each offset causes a value at the end of the session identifier to be incremented.

13. The system of claim 10, wherein the base unique identifier comprises a base identity assigned to a cluster of global short identities assigned to the first client.

14. The system of claim 10, wherein the operations further comprise:
assigning a cluster of global short identities to the first client, wherein each global short identity of the cluster comprises a value assigned from the cluster of global short identities.

15. The system of claim 14, wherein assigning the cluster of global short identities comprises determining a size of the cluster of global short identities to assign to the first client, the size being adaptive based on an amount of time used to fill up a previous cluster.

16. The system of claim 10, wherein:
the global short identity information received from the server comprises a base unique identifier for at least one other client, local short identities sent by the at least one other client, and a global sequencing order of edits determined by the server; and the determining the one or more global short identities comprises computing the one or more global short identities based on the base unique identifier for the at least one other client, the local short identities sent by the at least one other client, and the global sequencing order of edits.

17. A machine-storage medium comprising instructions which, when executed by one or more hardware processors of a machine, cause the machine to perform operations for synchronizing edits from a plurality of clients collaborating on a document, the operations comprising:

receiving, by a first client of the plurality of clients, one or more edits made to the document at the first client;

immediately in response to receiving each edit of the one or more edits, creating, by the first client, a local short identity for each character of the edit as the edit is made, the local short identity representing an offset from a base unique identifier associated with the first client, application of the offset to an end of the base unique identifier associated with the first client creating a stable universally unique identifier for each character of the edit;

temporarily storing each local short identity of the first client in a data structure at the first client;

transmitting, by the first client, local short identity information including the local short identity for each character to a server, the server allocating global short identities based on an order of receipt of local short identities from the plurality of clients collaborating on the document, each global short identity being a compact identity that is universally unique to the plurality of clients;

receiving, by the first client, global short identity information from the server including the allocated global short identities;

determining, by the first client from the global short identity information received from the server, one or more global short identities that each map to a local short identity of a second client of the plurality of clients collaborating on the document;

using the one or more global short identities determined from the global short identity information to identify corresponding edits from the second client; and updating, at the first client, the data structure by replacing each temporarily stored local short identity with a corresponding global short identity determined from the global short identity information.

18. The machine-storage medium of claim 17, wherein the base unique identifier comprises a session identifier assigned to the first client and each offset causes a value at the end of the session identifier to be incremented.

19. The machine-storage medium of claim 17, wherein the base unique identifier comprises a base identity assigned to a cluster of global identities assigned to the first client.

20. The machine-storage medium of claim 17, wherein the operations further comprise:

assigning a cluser of global short identities to the first client, wherein each global short identity of the cluster comprises a value assigned from the cluster of global short identities.

* * * * *